(12) United States Patent
Eraslan

(10) Patent No.: US 10,942,589 B2
(45) Date of Patent: Mar. 9, 2021

(54) METHOD FOR DETECTING EVENTS ON A TOUCH SCREEN USING MECHANICAL INPUT

(71) Applicant: Flex Ltd., Singapore (SG)

(72) Inventor: Mesut Gorkem Eraslan, San Jose, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/570,668

(22) Filed: Sep. 13, 2019

(65) Prior Publication Data

US 2020/0081554 A1 Mar. 12, 2020

Related U.S. Application Data

(63) Continuation of application No. 16/029,820, filed on Jul. 9, 2018, now abandoned.

(60) Provisional application No. 62/654,097, filed on Apr. 6, 2018.

(51) Int. Cl.
| | |
|---|---|
| *G06F 3/039* | (2013.01) |
| *G06F 3/02* | (2006.01) |
| *G06F 3/044* | (2006.01) |
| *G06F 3/0354* | (2013.01) |
| *G06F 3/045* | (2006.01) |
| *G06F 3/0488* | (2013.01) |
| *G06F 3/0362* | (2013.01) |
| *G06F 3/0338* | (2013.01) |

(52) U.S. Cl.
CPC ............ *G06F 3/039* (2013.01); *G06F 3/02* (2013.01); *G06F 3/0338* (2013.01); *G06F 3/0362* (2013.01); *G06F 3/03545* (2013.01); *G06F 3/044* (2013.01); *G06F 3/045* (2013.01); *G06F 3/04886* (2013.01)

(58) Field of Classification Search
CPC . G06F 3/039; G06F 3/02; G06F 3/044; G06F 3/03545; G06F 3/045; G06F 3/04886; G06F 3/0362; G06F 3/0338
See application file for complete search history.

(56) References Cited

U.S. PATENT DOCUMENTS

2006/0256090 A1* 11/2006 Huppi ................ A63F 13/2145
345/173
2016/0364014 A1* 12/2016 Dietz .................... B60K 37/06

* cited by examiner

*Primary Examiner* — Abhishek Sarma
(74) *Attorney, Agent, or Firm* — Sheridan Ross P.C.

(57) ABSTRACT

A mechanical input element (e.g., a dial or knob) that comprises one or more movable components is attached to an input screen (e.g., a touch screen). A microprocessor detects movement of the one or more movable components of the mechanical input element via the input screen. The detection of the movement of the one or more movable components of the mechanical input element is used to control various types of electronic/mechanical systems, such as controlling a volume on a radio.

19 Claims, 5 Drawing Sheets

METHOD FOR DETECTING EVENTS ON A TOUCH SCREEN USING MECHANICAL INPUT

CROSS REFERENCE TO RELATED APPLICATIONS

The present application is a continuation of and claims priority to U.S. patent application Ser. No. 16/029,820, filed on Jul. 9, 2018, entitled "METHOD FOR DETECTING EVENTS ON A TOUCH SCREEN USING MECHANICAL INPUT," which claims the benefits of and priority of U.S. Provisional Application Ser. No. 62/654,097, filed Apr. 6, 2018, entitled "METHOD TO REGISTER TOUCH EVENTS ON A CAPACITIVE TOUCH SCREEN BY USING A MECHANICAL DIAL", which is incorporated herein by this reference in its entirety. Each of the aforementioned applications is incorporated herein by reference in their entirety for all that they teach and for all purposes.

FIELD

The present disclosure is generally directed to touch screen technology, in particular, toward combining touch screen technology with mechanical input features.

BACKGROUND

Capacitive touchscreens are widely used for interacting with devices and systems. Such interaction is accomplished by detecting a capacitive change in a field created by the touchscreen layer that is caused by a human finger, an electronic pen, and/or a passive pen with a specially designed tip. Such capacitive touchscreens are increasingly used in automotive applications with varying user experiences. Some users still prefer to interact with systems in a car through the use of mechanical dials. For example, a user does not need to look at the mechanical dial to find it because they can feel the dial with their fingers while driving. In addition, the action of turning a mechanical dial provides intuitive feedback to the user about the changing of a setting. Moreover, touch, texture, and pressure confirms the correct interaction without looking as compared to touching a glass touchscreen with no texture and no pressure feedback.

DETAILED DESCRIPTION

Figure 1:
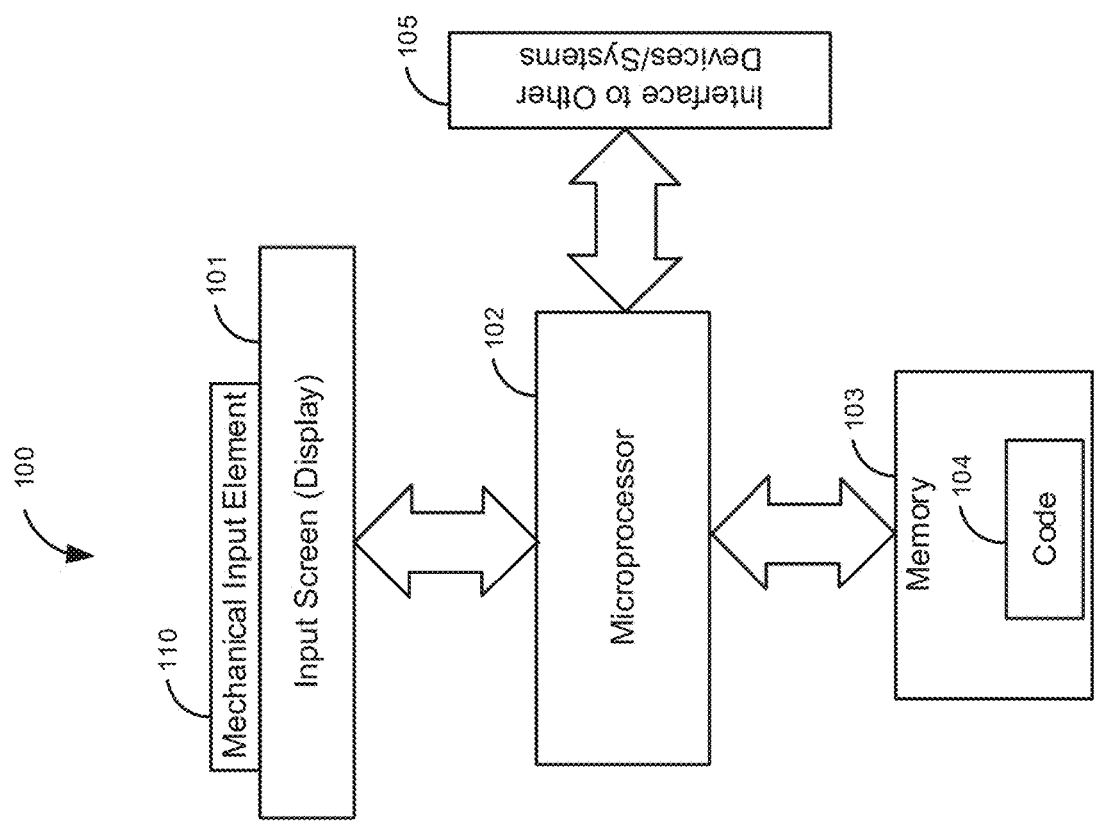
FIG. 1 is a block diagram of a first illustrative system for detecting an interaction between a mechanical input element and an input screen.

FIG. 1 is a block diagram of a first illustrative system 100 for detecting an interaction between a mechanical input element 110 and an input screen 101. The first illustrative system 100 comprises the input screen 101, a microprocessor 102, a memory 103, an interface to other devices/system 105, and a mechanical input element 110. The first illustrative system 100 may represent and/or interface with variety of systems/devices, such as, a car radio, a portable radio, a portable device, a cellular telephone, a laptop computer, a personal computer, a notebook device, a tablet device, a gaming system, a set-top device, a compact disk player, a music device, a television, an amplifier, a stereo, a disk player, a car odometer, an electronic speedometer, a heating/air control system, an appliance system, a cable box, and/or the like. Although not shown, the first illustrative system 100 may comprise other elements, such as a mouse, a keyboard, a keypad, a speaker, a microphone, and/or the like.

The input screen 101 can be or may include any input screen 101 that can detect movement of a mechanical input element 110, such as a capacitive touch screen, a resistive touch screen, a force touch screen (e.g., as described in https://en.wikipedia.org/wiki/Force_Touch), an indicative touch screen, an infrared touch screen, an optical touch screen, and/or the like. The input screen 101 typically has an associated display for displaying information to a user.

The microprocessor 102 can be or may include any microprocessor 102 that can process information from the input screen 101, such as, a digital signal processor, a microcontroller, an application specific processor, a multi-core processor, and off the shelf microprocessor 102, and/or the like. The microprocessor 102 interfaces with the input screen 101, the memory 103, the code 104, and the interface to other devices/systems 105. The microprocessor 102 may be integrated into a controller of the input screen 101.

The memory 103 can be or may include any memory 103, such as, a portable computer diskette, a hard disk, a random access memory (RAM), a read-only memory (ROM), an erasable programmable read-only memory (EPROM or Flash memory), an optical storage device, a magnetic storage device, or any suitable combination of the foregoing. The memory 103 is used to store information used by the microprocessor 102.

The memory 103 further comprises code 104. The code 104 can be or may include any type of computer instructions that program the microprocessor 102 to perform the processes described herein.

The interface to other devices/systems 105 can be or may include any known interface, such as, an Application Programming Interface (API), a network interface (e.g., a WiFi interface), a bus, a hardware interface, a serial interface, a parallel interface, a semaphore, a combination of these, and/or the like. The interface to other devices/systems 105 may be a direct interface from the microprocessor 102 or an indirect interface (e.g., a network interface).

The mechanical input element 110 can be or may include any mechanical input element 110 that can provide moment that can be detected by the input screen 101, such as a mechanical knob/dial, a mechanical slider, a mechanical button, a mechanical switch, a mechanical jack (i.e., a plug can be detected by the input screen 101), and/or the like. The mechanical input element 110 typically has one or more movable components that are used by the input screen 101 to detect movement, such as a stylus, a slider, a switch element, a rotatable knob/dial, a button, a connector, a lid, a cover, and/or the like.

Figure 2:
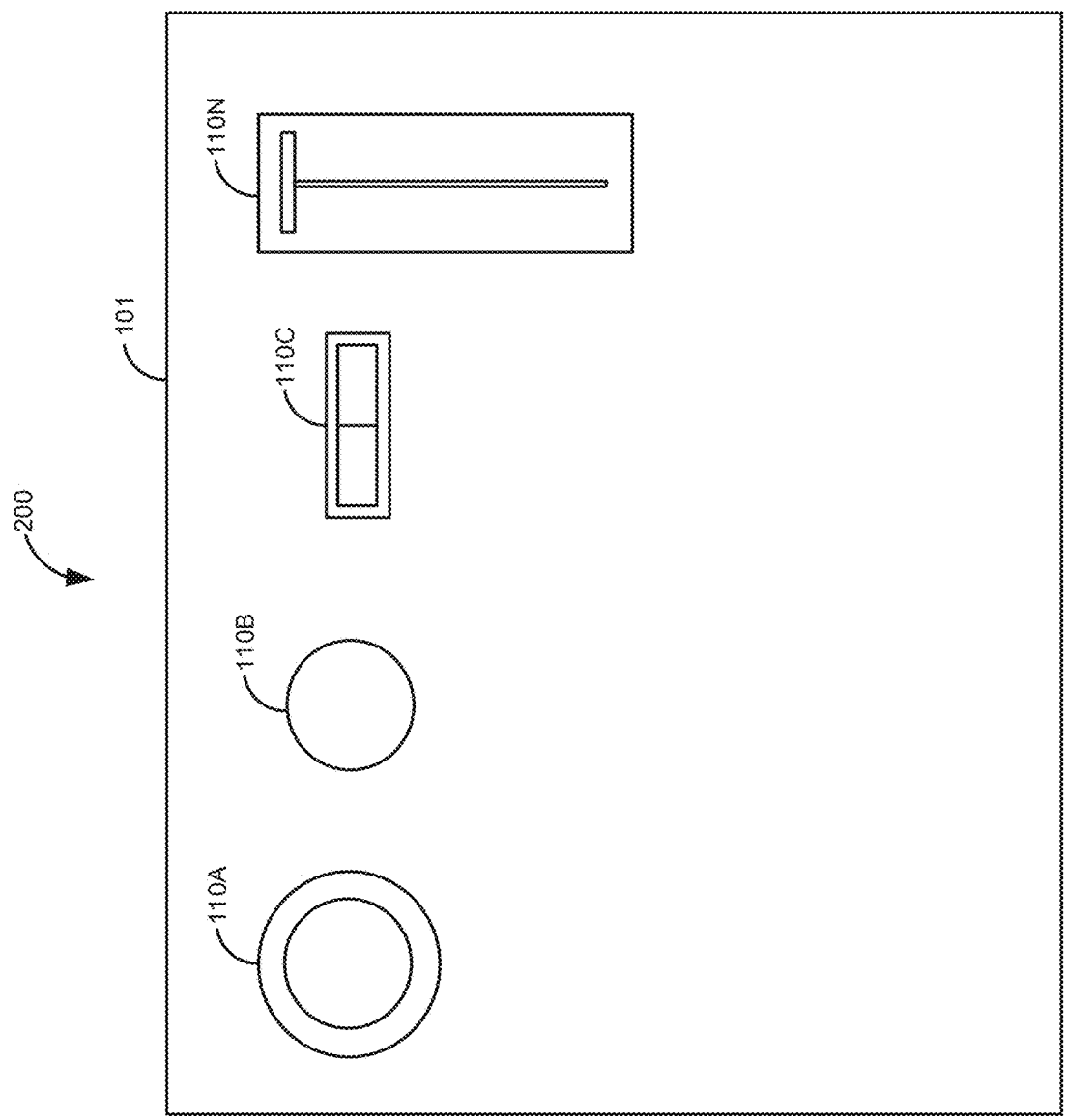
FIG. 2 is an illustrative frontal view of an input screen with attached mechanical input elements.

FIG. 2 is an illustrative frontal view 200 of an input screen 101 with attached mechanical input elements 110A-110N. The illustrative frontal view 200 of the input screen 101 with attached mechanical input elements 110A-110N is shown to highlight different types of mechanical input elements 110A-110N. Although not shown, various combinations and/or numbers of mechanical input elements 110 may be attached to the input screen 101. For example, the input screen 101 may only include a single mechanical input element (e.g., mechanical input element 110A), multiple mechanical input elements 110A-110N, or a combination of mechanical input elements 110A-110N.

The mechanical input element 110A is an exemplary embodiment of a mechanical dial/knob. The mechanical input element 110B is an exemplary embodiment of a mechanical button. The mechanical input element 110C is an exemplary embodiment of a mechanical rocker switch. The mechanical input element 110N is an exemplary embodiment of a mechanical slider. The mechanical input elements 110A-110N are for illustrative purposes only. One of skill in the art would understand that other types of mechanical input elements 110 can be envisioned to work with the embodiments described herein, such as a mechanical jack, a mechanical socket, a mechanical prong, a mechanical lid, a mechanical cover, and/or the like.

The mechanical input elements 110A-110N are typically attached to the input screen 101 using a type of glue or adhesive. However, in some embodiments other types of mechanisms may be used to attach the mechanical input elements 110A-110N to the input screen 101, such as using a bolt/nut (where there is a hole in the input screen 101), a fastener, and/or the like. In some embodiments, the input screen 101 is a standard off-the-shelf input screen 101.

Although the mechanical input elements 110A-110N appear to work similar to regular dials/knobs, buttons, switches, and sliders, the mechanical input elements 110A-110N by themselves do not actually control any type electrical/electronic signals. For example, the mechanical input element 110A (dial/knob) does not control restive properties (i.e., like a potentiometer) to control an electronic circuit. Similarly, the mechanical input elements 110B-110N do not by themselves switch or control an electrical/electronic circuit.

Figure 3:
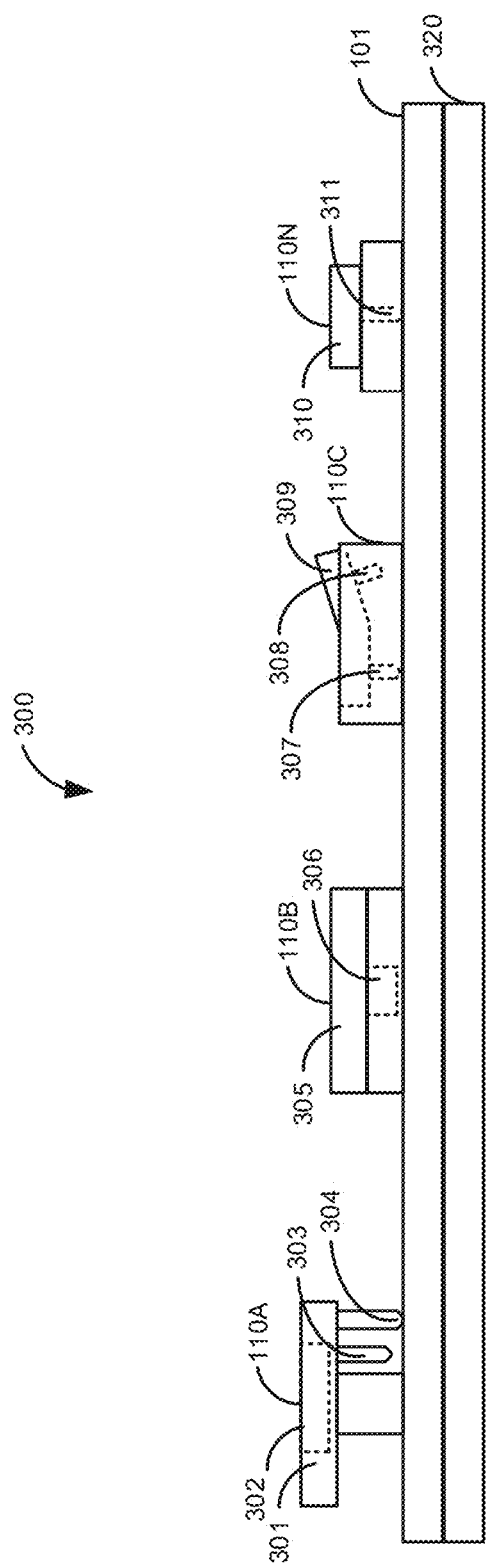
FIG. 3 is an illustrative side view of an input screen with attached mechanical input elements.

FIG. 3 is an illustrative side view 300 of an input screen 101 with attached mechanical input elements 110A-110N. In FIG. 3, the dashed lines represent components that are behind other components. The illustrative side view 300 of the input screen 101 comprises the mechanical input elements 110A-110N, the input screen 101, and a housing 320. FIG. 3 is an exemplary view and is not necessarily drawn to scale in order to illustrate how each of the mechanical input elements 110A-110N work. One of skill in the art would envision where the elements of the mechanical input elements 110A-110N would be of different sizes/proportions.

The housing 320 is an illustrative example of a structural component that may cover elements, such as the microprocessor 102, the memory 103, and the interface to other devices/systems 105. The housing 320 can be or may include any type of housing 320, such as a backing of a device (e.g., a backing a note pad device), a dashboard for a vehicle, a door of an appliance, a part of a portable musical device, a housing 320 of an amplifier, and/or the like. In some embodiments, there may not be a housing 320.

The mechanical input element 110A (the mechanical dial/knob) comprises a rotating element 301, a button element 302, a button stylus 303, and a rotator stylus 304. The button stylus 303 is attached to the button element 302. When the user presses the button element 302, this causes the button stylus 303 to touch the input screen 101. In one embodiment, the button element 302 may be part of the rotating element 301. When the button stylus 303 touches the input screen 101, the microprocessor 102 receives information that the button stylus 303 has touched the input screen 101. The microprocessor 102 determines the touch to the input screen 101 based on a programed location of where the button stylus 303 contacts the input screen 101 (a specific X/Y coordinate). In one embodiment, the button stylus 303 may rotate when the rotating element 301 rotates. In this case, the microprocessor 102 determines the contact of the button stylus 303 based on a circular pattern (specific X/Y coordinates of a circular pattern for the button stylus 303). Based on the button stylus 303 touching the input screen 101, the microprocessor 102 may initiate an event. For example, the microprocessor 102 may turn on a radio or start a car.

The rotator stylus 304 is attached to the rotating element 301. When a user turns the rotating element 301 of the dial/knob (mechanical input element 110A), the rotator stylus 304 rotates in a similar manner (a circular manner) as the rotating element 301. As the rotating element 301 rotates, the rotator stylus 304 touches the input screen 101 as it rotates. The touching of the rotator stylus 304 as it rotates allows the input screen 101 to detect the movement of the dial/knob (mechanical input element 110A). For example, the input screen 101 may be a capacitive touch screen 101, a resistive touch screen 101 (where the rotator stylus 304 presses the resistive touch screen 101), and/or a force touch screen (where the rotator stylus 304 presses the resistive touch screen 101) that can detect the movement of the rotator stylus 304 as the rotating element 301 is turned. Based on the detected rotation of the rotator stylus 304, the microprocessor 102 can generate an event. For example, based on a rotation speed/direction, the microprocessor 102 may turn up or turn down a volume of a radio (e.g., a specific rate based on the rotation), turn down a temperate of a fridge, turn up a temperature of a heating system, and/or the like.

In some embodiments, the button stylus 303 and the rotator stylus 304 may be comprised of a specific material that allows the input screen 101 to detect the movement of the button stylus 303 and the rotator stylus 304. For example, the button stylus 303 and the rotator stylus 304 may comprise or be coated with a material that provides capacitive characteristics that can be detected by a capacitive touch screen 101.

In one embodiment, the mechanical input element 110A may not include the button element 302/button stylus 303 while still providing similar functionality. For example, the rotator element 301 may only rotate a fixed number of degrees (e.g., 350 degrees out of 360 degrees). At 0 degrees, this is considered the off position for a switch (determined by the X/Y coordinates of the rotator stylus 304). For example, when the mechanical input 110A is at 0 degrees (the rotator stylus is at a specific X/Y coordinate), a car radio is turned off. When the user rotates the rotating element 301 past 0 degrees, the user may hear a mechanical click (e.g., like existing dials with an incorporated switch), the rotating causes the radio to turn on. The user can then adjust the volume for the car radio by continuing to rotate the rotating element 301.

In one embodiment, the mechanical input element 110A includes the rotating element 301, the button element 302, the rotator stylus 304, but not the button stylus 303. In this embodiment, the input screen 101 is a force input screen 101. The rotator stylus 304 rotates when the user turns the rotating element 301 in a similar manner as discussed above. The rotation of the rotator stylus 304 causes the microprocessor 102 to initiate an event (e.g., adjusting a volume). The rotator stylus 304 provides an initial pressure to the force input screen 101. If the user pushes the button element 302, the initial pressure of the rotator stylus 304 to the force input screen 101 is increased to a second level. The force input screen 101 detects the change in pressure of the rotator stylus 304 and creates a different event. For example, to switch a radio on or off.

In one embodiment, the mechanical input element 110A may be transparent or hollow (e.g., have a hole in the middle of the dial/knob) so that a user can see the input screen 101 (display information) through the mechanical input element 110A. An on/off sign can be displayed by the input screen 101 at the bottom and/or in the middle of the mechanical input element 110A that is visible to the user. The user may touch the input screen 101 through a hole in the mechanical input element 110A or push the transparent rotating element 301 to turn something on and off.

In one embodiment, the rotator stylus 304 may move up and down. For example, when the user first pushes the rotating element 301, the rotator stylus 304 is pushed down to contact the input screen 101. When the user pushes the rotating element 301 again, the rotator stylus 304 is moved up and does not contact the input screen 101. This can simulate a switch (e.g., on when the rotator stylus 304 is in contact with the input screen and off when the rotator stylus is not in contact with the input screen 101). Alternatively, the rotator stylus 304 may stay in contact with the input screen 101 and move right/left to indicate an on/off action.

The mechanical input element 110B (the mechanical button) comprises a button element 305 and a button stylus 306. When the user pushes the button element 305, the button stylus 306 touches the input screen 101. When the button stylus 306 touches the input screen 101, the microprocessor 102 detects the contact with the input screen 101. The microprocessor 102, based on the location of where the button stylus 306 touches the input screen 101 (an X/Y coordinate) generates an event. For example, to select a specific radio station or to switch on lights in a car.

The mechanical input element 110C (a mechanical switch) is an exemplary example of a rocker switch. The mechanical input element 110C comprises rocker styluses 307-308 and a rocker 309. As shown in FIG. 3, the rocker stylus 307 is touching the input screen 101. If the user pushes the rocker 309 to the other position, the rocker stylus 307 will no longer touch the input screen 101 and the rocker stylus 308 will be touching the input screen 101. Based on a defined locations (X/Y coordinates) of where the rocker styluses 307-308 touch the input screen 101, the microprocessor 102 can generate different events. For example, when the rocker stylus 307 touches the input screen 101, the microprocessor 102 may turn on a device or appliance. When the rocker stylus 308 touches the input screen 101, the device or appliance may be turned off.

The mechanical input element 110N (a mechanical slider) comprises a slider element 310 and a slider stylus 311. When a user moves the slider element 310, the slider stylus 311 moves across the input screen 101. The microprocessor 102 determines the location of the slider stylus 311 based on where the slider stylus 311 is touching the input screen 101. Based on the location, an event is generated. For example, the slider may be used to control volume for a radio or a temperate for a heating/air control system.

Although not shown in FIG. 3, other types of mechanical input elements 110 are envisioned. For example, when a plug is pushed into a jack, this may cause a stylus to contact the input screen 101. Alternatively, when a lid or cover is placed over the input screen 101, a stylus may contact the input screen 101.

In FIG. 3, the button stylus 303, the rotator stylus 304, the button stylus 306, the rocker styluses 307-308, and the slider stylus 311 are passive styluses. This means that the rotator stylus 304, the button stylus 306, the rocker styluses 307-308, and the slider stylus 311 (along with the mechanical input elements 110A-110N) do not contain any electric or electronic components. However, in one embodiment, the rotator stylus 304, the button stylus 306, the rocker styluses 307-308, the slider stylus 311, and/or the mechanical input elements 110A-110N may include electric/electronic components. For example, where an inductive touch screen 101 is used to generate an inductive field detected by the input screen 101.

Figure 4A:
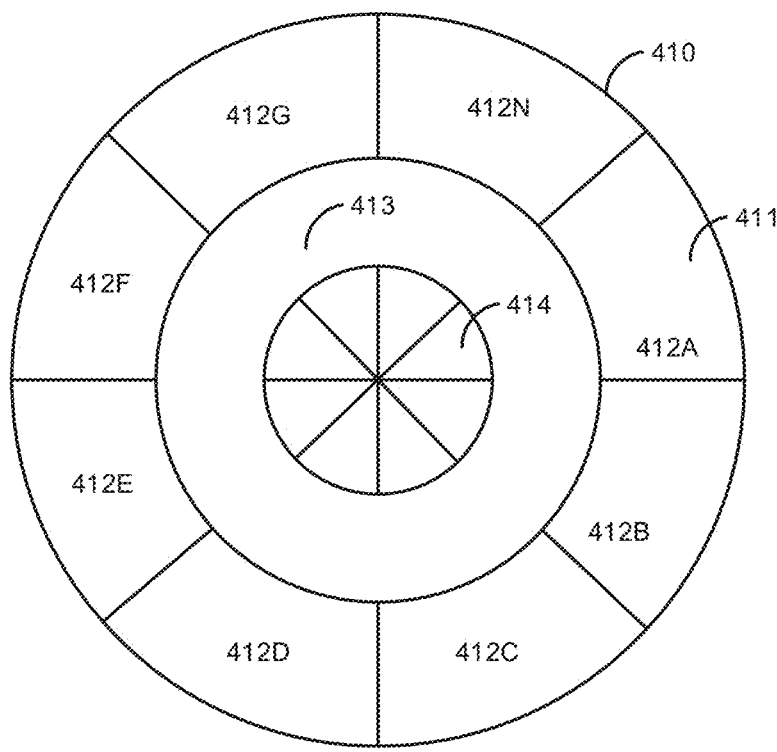
FIG. 4A is a first illustrative bottom view of a mechanical dial/button that uses different colors for detecting movement of the mechanical dial/button by an optical touch screen.

FIG. 4A is a first illustrative bottom view of a mechanical dial/button (a mechanical input element 410) that uses different colors for detecting movement of the mechanical dial/button by an optical touch screen 101. The mechanical input element 410 comprises a dial/knob and a button (similar to mechanical input element 110A). In FIG. 4A, the mechanical input element 410 comprises a color ring 411, color areas 412A-412N, an adhesive area 413, and a stylus cover 414.

The color ring 411 comprises two or more color areas 412. For example, as shown in FIG. 4A, the color ring 411 comprises eight color areas 412A-412N. The color areas 412A-412N may comprise different colors in each of the color areas 412A-412N. Alternatively, the color areas 412A-412N may alternate between colors. One can envision that various types of color patterns can be used for the color areas 412A-412N. The color areas 412A-412N may be a series of different types of shapes. For example, the color areas 412A-412N may a set of colored circles and/or colored squares evenly spaced in the color ring 411. In one embodiment, instead of using different colors, different shapes may be used. For example, the color areas 412A-412N may comprise alternating circles/squares that are all the same color (e.g., black with a white background). In this embodiment, the microprocessor 102 determines movement of the mechanical input element 410 based on the moving shapes.

The adhesive area 413 is where the mechanical input element 410 attaches to the input screen 101. The adhesive area 413 is shown between the color ring 411 and the stylus cover 414. In another embodiment, the adhesive area 413 may be at the outside edge of the bottom of the mechanical input element 410 (where the color ring 411 is located in FIG. 4A). In this embodiment, the color ring 411 would be where the adhesive ring 413 is located in FIG. 4A. In other words, the color ring 411 and the adhesive area 413 of FIG. 4A would be swapped.

Figure 4B:
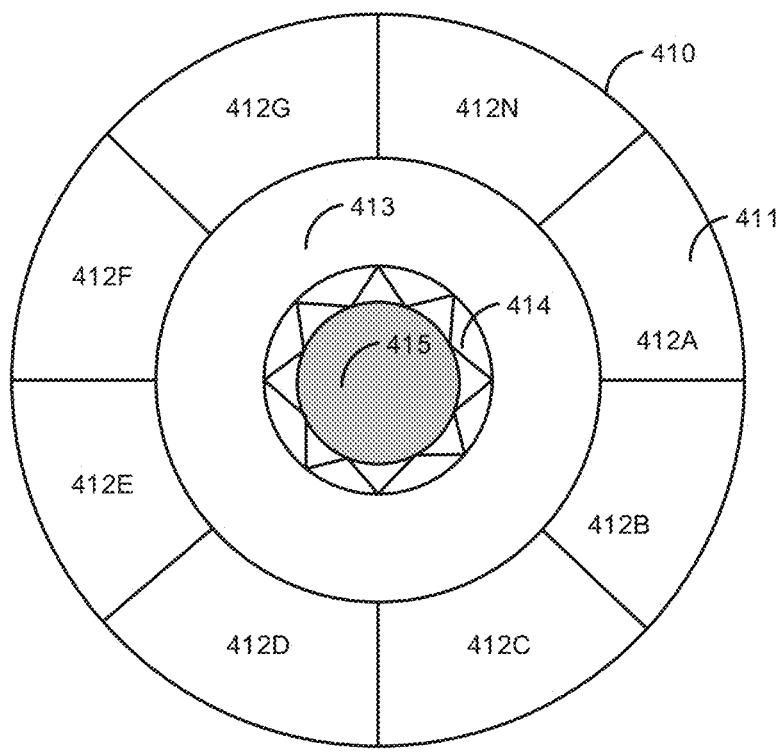
FIG. 4B is a second illustrative bottom view of a mechanical dial/button that uses different colors for detecting movement of the mechanical dial/button by an optical touch screen.

The stylus cover 414 is an element that covers a button stylus 415 (shown in FIG. 4B). The stylus cover 414 has slits that allow the button stylus 415 to be pushed through the stylus cover 414. Instead of using slits, other mechanical components may be used for the stylus cover. For example, a lid may open up to allow the button stylus 415 to be shown to the input screen 101.

FIG. 4B is a second illustrative bottom view of a mechanical dial/button that uses different colors for detecting movement of the mechanical dial/button by an optical touch screen. The second illustrative bottom view of FIG. 4B is that same as FIG. 4A with the exception that when the button in the mechanical input element 410 is pushed (similar to that described for mechanical input element 110A), the button stylus 415 is pushed through the stylus cover 414. As shown in FIGS. 4A-4B, the stylus cover 414 and the button stylus 415 are different colors. In one embodiment different shapes may be used. For example, a square may be displayed for by the stylus cover 414 and then a circle may be displayed when the button stylus 415 is shown in FIG. 4B.

The mechanical input element 410 comprises a rotating element that includes the color ring 411. When a user rotates the mechanical input element 410, the input screen 101 (an optical input screen 101) detects the rotating pattern of the color areas 412A-412N or objects in the color areas 412A-412N. Based on the speed and/or direction of the rotation, the microprocessor 102 can trigger various events, such as controlling a volume or a heating temperature.

When the user pushes the button element (not shown) of the mechanical input element 410, the optical input screen 101 can detect the change in color and/or an object at a specific X/Y coordinates of where the button stylus 415 is located. The detection of the change in color and/or an object can cause the microprocessor 102 to trigger one or more events (e.g., to turn on a device/appliance).

In one embodiment, the mechanical input element 410 does not have a button. In this embodiment there is no button stylus cover 414. In this embodiment, the adhesive area 413 may include the area of the button stylus cover 414.

In FIGS. 4A-4B, the description is based on using an optical input screen 101. However, other types of input screens 101 may be used. For example, an inferred input screen 101 may be used to detect different inferred wavelengths.

The same mechanical input elements 110A-110N discussed for FIGS. 2-3 can be designed in a similar manner to mechanical input element 410 where different colors/objects are used to detect movement of a mechanical input element 110A-110N. For example, for a slider, the stylus may have one color and the rest of the back of the slider is a different color. For the rocker switch, when the rocker switch is in one position, only one color is able to be seen by the optical input screen 101 at a specific X/Y coordinate.

In one embodiment, a combination of colors areas 412A-142N and styluses (e.g., 303, 304, 306, 307-308, and 311) may be used to determine events. For example, the input screen 101 may detect both optical input and touch input.

One advantage to using mechanical input elements 110A-110N/410 as described above is that their functionality can change dynamically. Based on what is displayed in the input screen 101, the function of a dial, a knob, a slider, a button, a switch, and/or the like can change based on the context of what is being displayed by the input screen 101. For example, when the input screen 101 is displaying information associated with a vehicle radio, the mechanical input element 110A (a dial) can control a volume of the vehicle radio. The input screen 101 may display a message indicating that the mechanical input element 110A is a volume control for a radio. When the display is being used to show heating information for the vehicle, the same mechanical input element 110A (a dial) may be used to change a temperature level in the vehicle.

Figure 5:
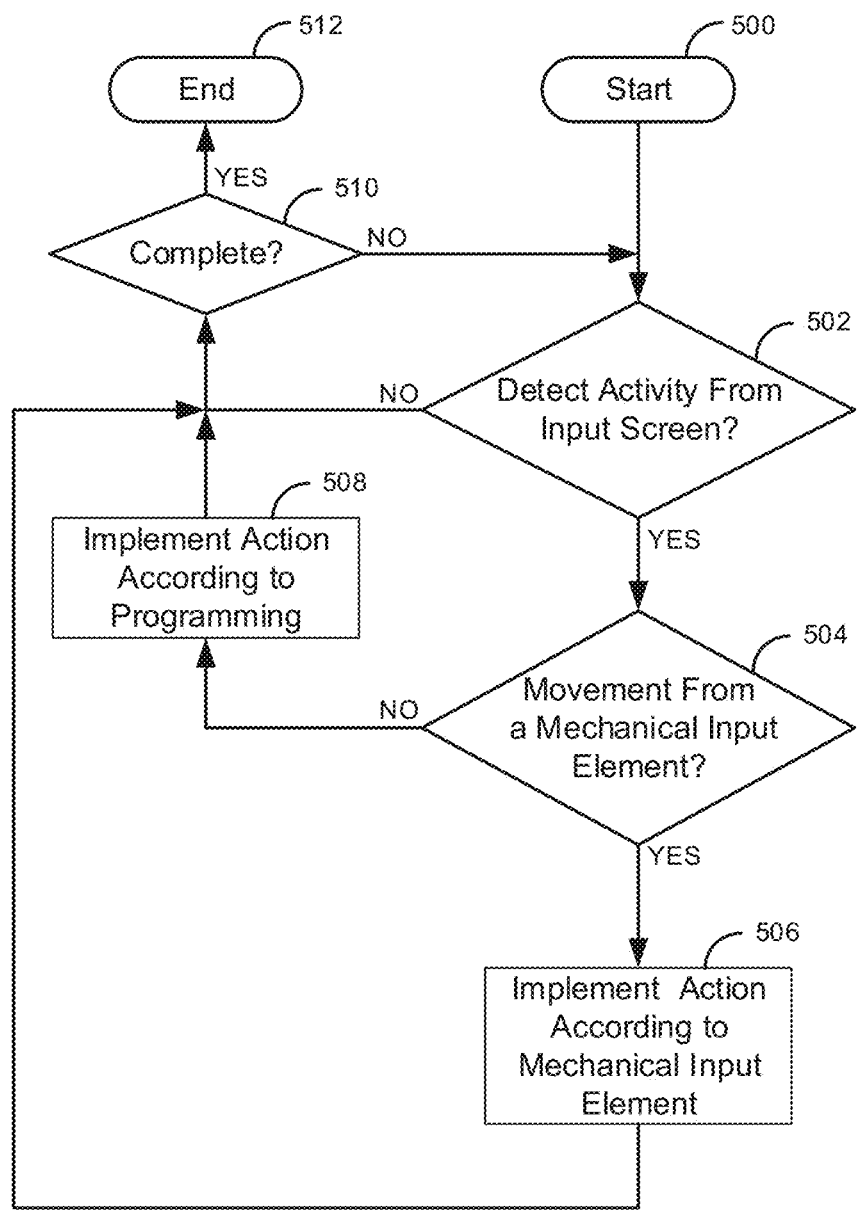
FIG. 5 is an illustrative flow diagram of a process for detecting movement of a mechanical input device by an input screen.

FIG. 5 is an illustrative flow diagram of a process for detecting movement of a mechanical input element 110A-110N/410 by an input screen 101. The process starts in step 500. The microprocessor 102 detects activity from the input screen 101 in step 502. The activity of step 502 may be activity associated with the input screen 101. If input activity is not detected from the input screen 101 in step 502, the microprocessor 102 determines if the process is complete in step 510. For example, the process may be complete when a user turns off a car where the input screen 101 is used as part of a radio display. If the process is complete in step 510, the process ends in step 512. Otherwise, if the process is not complete in step 510, the process goes back to step 502 to see if activity has been detected from the input screen 101.

If activity from the input screen 101 has been detected in step 502, the microprocessor 102 determines if the activity is based on a movement from a mechanical input element 110A-110N/410. As discussed above, the microprocessor 102 can determine movement of a mechanical input element 110A-110N/410 based on programmed X/Y coordinates. If the activity is based on movement from a mechanical input element 110A-110N/410 in step 504, the microprocessor 102 implements one or more actions based on the activity from the mechanical input element 110A-110N/410 in step 506. The process then goes back to step 510. If the activity is not based on movement from a mechanical input element 110/410 (e.g., a user touching the input screen 101 at a specific X/Y coordinate), the microprocessor 102 implements, in step 508, the action according to the programming associated with the rest of the input screen 101 (the areas not associated with mechanical input elements 110A-110N/410). The process then goes to step 510.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 102 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors 102), memory 103, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor 102 or microcomputer systems being utilized.

In yet another embodiment, the disclosed methods may be partially implemented in software that can be stored on a storage medium, executed on programmed general-purpose computer with the cooperation of a controller and memory 103, a special purpose computer, a microprocessor 102, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a device comprising: a mechanical input element that comprises one or more movable components; an input screen, wherein the mechanical input element is attached to the input screen; and a microprocessor that detects movement of the one or more movable components of the mechanical input element via the input screen.

Aspects of the above device include wherein the input screen is one of a capacitive touch screen, a resistive touch screen, an inductive touch screen, or a force touch screen and wherein the microprocessor detects the movement of the one or more movable components via the one of the capacitive touch screen, the resistive touch screen, the inductive touch screen, or the force touch screen.

Aspects of the above device include wherein the mechanical input element is a dial/knob and wherein the one or more movable components comprise a rotating element with an attached first stylus that at least one of rotates, moves right, moves left, moves up, and moves down with the rotating element while touching the one of the capacitive touch screen, the resistive touch screen, the inductive touch screen, or the force touch screen.

Aspects of the above device include wherein the dial/knob comprises a second stylus that moves up and down based on a user pushing the dial/knob or a button in the dial/knob and wherein the microprocessor detects when the second stylus is in a down position via the one of the capacitive touch screen, the resistive touch screen, the inductive touch screen, or the force touch screen.

Aspects of the above device include wherein the input screen is an optical input screen and wherein the microprocessor detects movement, via the optical input screen, of the one or more movable components by detecting a change in a color and/or shape from a location under the mechanical input element.

Aspects of the above device include wherein the mechanical input element is a dial/knob and wherein the one or more movable components comprise a rotating element with two or more different colors and/or shapes under the rotating element.

Aspects of the above device include wherein the dial/knob or a button in the dial/knob can be pushed down by a user, wherein the pushing down by the user causes a different color and/or shape to be shown at a specific location under the dial/knob, and wherein the microprocessor detects, via the optical input screen, the different color and/or shape shown at the specific location under the dial/knob.

Aspects of the above device include wherein the mechanical input element is a rocker switch and wherein the rocker switch comprises two rocker styluses that alternate touching the input screen based on a position of the rocker switch.

Aspects of the above device include wherein the mechanical input element is a slider and wherein the slider comprises a slider element connected to a slider stylus that moves in contact with the input screen when a user moves the slider element.

Aspects of the above device include wherein the mechanical input element is a slider, wherein the slider comprises a slider element connected to a slider stylus, wherein the slider stylus comprises a color and/or shape on the slider stylus that is detected by the microprocessor, via the input screen, when a user moves the slider element.

Aspects of the above device include wherein the input screen is a force touch screen, wherein the mechanical input element is a dial/knob with a button and wherein the one or more movable components comprise a rotating element with an attached stylus that rotates with the rotating element while touching the force touch screen with a first pressure, and wherein when a user pushes the button, the attached stylus touches the force screen with a second pressure.

Embodiments include a method comprising: detecting, by a microprocessor, movement of one or more movable components of a mechanical input element via an input screen, wherein the mechanical input element comprises one or more movable components and wherein the mechanical input element is attached to the input screen.

Aspects of the above method include wherein the input screen is one of a capacitive touch screen, a resistive touch screen, an inductive touch screen, or a force touch screen and wherein the microprocessor detects the movement of the one or more movable components via the one of the capacitive touch screen, the resistive touch screen, the inductive touch screen, or the force touch screen.

Aspects of the above method include wherein the mechanical input element is a dial/knob and wherein the one or more movable components comprises a rotating element with an attached first stylus that at least one of rotates, moves right, moves left, moves up, and moves down with the rotating element while touching the one of the capacitive touch screen, the resistive touch screen, the inductive touch screen, or the force touch screen.

Aspects of the above method include wherein the dial/knob comprises a second stylus that moves up and down based on a user pushing the dial/knob or a button in the dial/knob and wherein the microprocessor detects when the second stylus is in a down position via the one of the capacitive touch screen, the resistive touch screen, the inductive touch screen, or the force touch screen.

Aspects of the above method include wherein the input screen is an optical input screen and wherein the microprocessor detects movement, via the optical input screen, of the one or more movable components by detecting a change in a color and/or shape from a location under the mechanical input element.

Aspects of the above method include wherein the mechanical input element is a dial/knob and wherein the one or more movable components comprise a rotating element with two or more different colors and/or shapes under the rotating element.

Aspects of the above method include wherein the dial/knob or a button in the dial/knob can be pushed down by a user, wherein the pushing down by the user causes a different color and/or shape to be shown at a specific location under the dial/knob, and wherein the microprocessor, detects, via the input screen, the different color and/or shape shown at the specific location under the dial/knob.

Aspects of the above method include wherein the mechanical input element is a slider and wherein the slider comprises a slider element connected to a slider stylus that moves in contact with the input screen when a user moves the slider element.

Aspects of the above method include wherein the mechanical input element is a slider, wherein the slider comprises a slider element connected to a slider stylus, wherein the slider stylus comprises a color and/or shape on the slider stylus that is detected by the microprocessor, via the input screen, when a user moves the slider element.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A device comprising:
   a mechanical input element that comprises one or more movable components, wherein the mechanical input element is a dial/knob, wherein the one or more movable components comprise a rotating element with an attached first stylus and second stylus, wherein the second stylus moves up and down based on a user pushing the dial/knob or a button in the dial/knob, and wherein the attached first stylus at least one of rotates, moves right, moves left, moves up, and moves down with the rotating element while touching an input screen, wherein the mechanical input element is attached to the input screen; and
   a microprocessor that detects movement of the one or more movable components of the mechanical input element via the input screen.

2. The device of claim 1, wherein the input screen is one of a capacitive touch screen, a resistive touch screen, an inductive touch screen, or a force touch screen and wherein the microprocessor detects movement of the one or more movable components via the one of the capacitive touch screen, the resistive touch screen, the inductive touch screen, or the force touch screen.

3. The device of claim 1, further comprising:
   a second mechanical input element that comprises one or more moveable components.

4. The device of claim 3, wherein the input screen is an optical input screen and wherein the microprocessor detects movement, via the optical input screen, of the one or more movable components of the second mechanical input element by detecting a change in a color and/or shape of a color ring on the mechanical input element.

5. The device of claim 4, wherein the second mechanical input element is another dial/knob and wherein the one or more movable components comprise a rotating element with two or more different colors and/or shapes under the rotating element.

6. The device of claim 5, wherein the second mechanical input element or a button in the second mechanical input element can be pushed down by the user, wherein the pushing down by the user causes a different color and/or shape to be shown at a specific location under the second mechanical input element, and wherein the microprocessor detects, via the optical input screen, the different color and/or shape shown at the specific location under the second mechanical input element.

7. The device of claim 3, wherein the second mechanical input element is a rocker switch and wherein the rocker switch comprises two rocker styluses that alternate touching the input screen based on a position of the rocker switch.

8. The device of claim 3, wherein the second mechanical input element is a slider and wherein the slider comprises a slider element connected to a slider stylus that moves in contact with the input screen when the user moves the slider element.

9. The device of claim 3, wherein the second mechanical input element is a slider, wherein the slider comprises a slider element connected to a slider stylus, wherein the slider stylus comprises a color and/or shape on the slider stylus that is detected by the microprocessor, via the input screen, when the user moves the slider element.

10. The device of claim 1, wherein the input screen is a force touch screen, wherein the rotating element with the attached stylus that rotates with the rotating element while touching the force touch screen with a first pressure, and wherein when the user pushes the button, the attached stylus touches the force touch screen with a second pressure.

11. A method comprising:
    detecting, by a microprocessor, via an optical input screen, movement of one or more movable components of a mechanical input element, wherein the mechanical input element comprises a color ring comprising two or more different colors and/or shapes, wherein detecting the movement of the one or more movable components comprises detecting a change in a color and/or shape of the color ring of the mechanical input element, and wherein the mechanical input element is attached to the optical input screen.

12. The method of claim 11, wherein the mechanical input element is a dial/knob and wherein the one or more movable components comprise a rotating element with two or more different colors and/or shapes under the rotating element.

13. The method of claim 12, wherein the dial/knob or a button in the dial/knob can be pushed down by a user, wherein the pushing down of the dial/knob or a button in the dial/knob by the user causes a different color and/or shape to be shown at a specific location under the dial/knob, and wherein the microprocessor, detects, via the optical input screen, the different color and/or shape shown at the specific location under the dial/knob.

14. The method of claim 11, wherein the mechanical input element is a slider and wherein the slider comprises a slider element connected to a slider stylus that moves in contact with the optical input screen when a user moves the slider element.

15. The method of claim 11, wherein the mechanical input element is a slider, wherein the slider comprises a slider element connected to a slider stylus, wherein the slider stylus comprises a color and/or shape on the slider stylus that is detected by the microprocessor, via the optical input screen, when a user moves the slider element.

16. A device comprising:
   a mechanical input element that comprises:
      one or more movable components; and
      a color ring that comprises two or more different colors and/or shapes, wherein the color ring is located at a position on an underside of the mechanical input element;
   an optical input screen, wherein the mechanical input element is attached to the optical input screen; and
   a microprocessor that detects, via the optical input screen, movement of the one or more movable components of the mechanical input element by detecting a change in a color and/or shape of the color ring.

17. The device of claim 16, wherein the mechanical input element is a dial/knob.

18. The claim 17, wherein the dial/knob includes a button that can be pushed down by a user, wherein the pushing down of the button by the user causes a different color and/or shape to be shown at a specific location under the dial/knob, and wherein the microprocessor, detects, via the optical input screen, the different color and/or shape shown at the specific location under the dial/knob.

19. The device of claim 16, further comprising:
   a slider and wherein the slider comprises a slider element connected to a slider stylus that moves in contact with the optical input screen when a user moves the slider element.

* * * * *